United States Patent
Singh et al.

(10) Patent No.: US 10,771,628 B1
(45) Date of Patent: Sep. 8, 2020

(54) SYSTEMS AND METHODS FOR FORECASTING INBOUND TELECOMMUNICATIONS ASSOCIATED WITH AN ELECTRONIC TRANSACTIONS SUBSCRIPTION PLATFORM

(71) Applicant: CaaStle, Inc., New York, NY (US)

(72) Inventors: Avinash Singh, Delhi (IN); Prashant Kumar Rai, Noida (IN); Chirag Jain, New Delhi (IN); Ankita Sinha, Delhi (IN)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 16/811,831

(22) Filed: Mar. 6, 2020

(51) Int. Cl.
*H04M 3/523* (2006.01)
*H04M 3/51* (2006.01)
*G06N 20/00* (2019.01)
*H04M 3/36* (2006.01)

(52) U.S. Cl.
CPC .......... *H04M 3/5238* (2013.01); *G06N 20/00* (2019.01); *H04M 3/36* (2013.01); *H04M 3/5175* (2013.01); *H04M 3/5233* (2013.01); *H04M 3/5237* (2013.01); *H04M 2201/42* (2013.01)

(58) Field of Classification Search
CPC .... H04M 3/5238; H04M 3/5175; H04M 3/36; G06N 20/00
USPC .............. 379/266.06, 266.07, 266.08, 265.1, 379/265.05, 265.11, 265.01, 265.07
See application file for complete search history.

(56) References Cited

U.S. PATENT DOCUMENTS 9,787,840 B1 * 10/2017 Neuer, III ........... H04M 3/5232

* cited by examiner

*Primary Examiner* — Thjuan K Addy
(74) *Attorney, Agent, or Firm* — Bookoff McAndrews, PLLC

(57) ABSTRACT

Disclosed are systems and methods for forecasting inbound telecommunications, and more particularly, for analyzing real-time and historical call center data, and applying a forecasting model to said data in order to predict inbound call volume. Additionally, tools are disclosed for manipulating call center data and generating visual representations of metrics pertaining to forecasting call center data via a dashboard.

20 Claims, 10 Drawing Sheets

DASHBOARD

600

| RUN DATE | 2/10/2020 | | | | | | |
|---|---|---|---|---|---|---|---|
| | OWNED BRAND PARAMETERS | | | | | | OWNED BRANDS |
| INPUTS | CONVERSION/RETENTION DATA | | | | | | BRAND 1 |
| | MONTH COHORT | CONVERSIONS RATE | INITIAL | LOST | CONVERT TO PAID | | BRAND 2 |
| | 1 MONTH | 42% | 1788 | 1037 | 751 | | BRAND 3 |
| | MONTH COHORT-PS | RETENTION RATE | INITIAL | LOST | RETAINED | | BRAND 4 |
| | 1 MONTHS | 76% | 1435 | 344 | 1091 | | |
| | 2 MONTHS | 81% | 998 | 190 | 808 | | |
| | 3 MONTHS | 82% | 683 | 123 | 560 | | |
| | MORE THAN 3 MONTHS | 93% | 14355 | 1005 | 13350 | | |

602 (left of run date), 604 (owned brand parameters)

| CANCELLATION CALL MULTIPLE OR POSTPONE RATE | BAU CONTACT RATE | MARKETING CONVERSION TO SUBSCRIBER | LOAD FACTOR |
|---|---|---|---|
| 0.35 | 0.08 | 0.05 | 1 |

606

| ACQUIRED USERS BY DAYS | DAY1 | DAY2 | DAY3 | DAY4 | DAY5 | DAY6 | DAY7 |
|---|---|---|---|---|---|---|---|
| DATE | 2/11/2020 | 2/12/2020 | 2/13/2020 | 2/14/2020 | 2/15/2020 | 2/16/2020 | 2/17/2020 |
| WEEKDAY | TUESDAY | WEDNESDAY | THURSDAY | FRIDAY | SATURDAY | SUNDAY | MONDAY |
| NON-MARKETING/BAU ACQ. USERS | 60 | 60 | 60 | 60 | 60 | 60 | 60 |
| MARKETING CAMPAIGNS SENT | 0 | 0 | 0 | 0 | 0 | 0 | 0 |
| MARKETING OR NON-BAU ADDS | 0 | 0 | 0 | 0 | 0 | 0 | 0 |

DASHBOARD — 600

External Parameters — Retention Related (602, Inputs)

| MONTH COHORT | RETENTION/CONVERSION RATE | INITIAL PS | LOST | RETAINED |
|---|---|---|---|---|
| 1 MONTHS | 72% | 4985 | 1375 | 3610 |
| 2 MONTHS | 81% | 3315 | 645 | 2670 |
| 3 MONTHS | 83% | 1584 | 264 | 1320 |
| 4 MONTHS | 83% | 824 | 140 | 684 |
| MORE THAN 4 MONTHS | 89% | 2819 | 310 | 2509 |

610

| CANCELLATION CALL MULTIPLE OR POSTPONE RATE | BAU CONTACT RATE | MARKETING CONVERSION TO SUBSCRIBER |
|---|---|---|
| 0.25 | 0.08 | 0.05 |

612

| EXTERNAL BRANDS |
|---|
| CLOTHIER 1 |
| CLOTHIER 2 |
| CLOTHIER 3 |
| CLOTHIER 4 |

Acquired Users by Days — 614

| WEEKDAY | DAY1 TUESDAY | DAY2 WEDNESDAY | DAY3 THURSDAY | DAY4 FRIDAY | DAY5 SATURDAY | DAY6 SUNDAY | DAY7 MONDAY |
|---|---|---|---|---|---|---|---|
| NON-MARKETING/BAU ACQ. USERS | 166 | 166 | 166 | 166 | 166 | 166 | 166 |
| MARKETING CAMPAIGNS SENT | 0 | 0 | 0 | 0 | 0 | 0 | 0 |
| MARKETING OR NON-BAU ADDS | 0 | 0 | 0 | 0 | 0 | 0 | 0 |

FIG. 6B

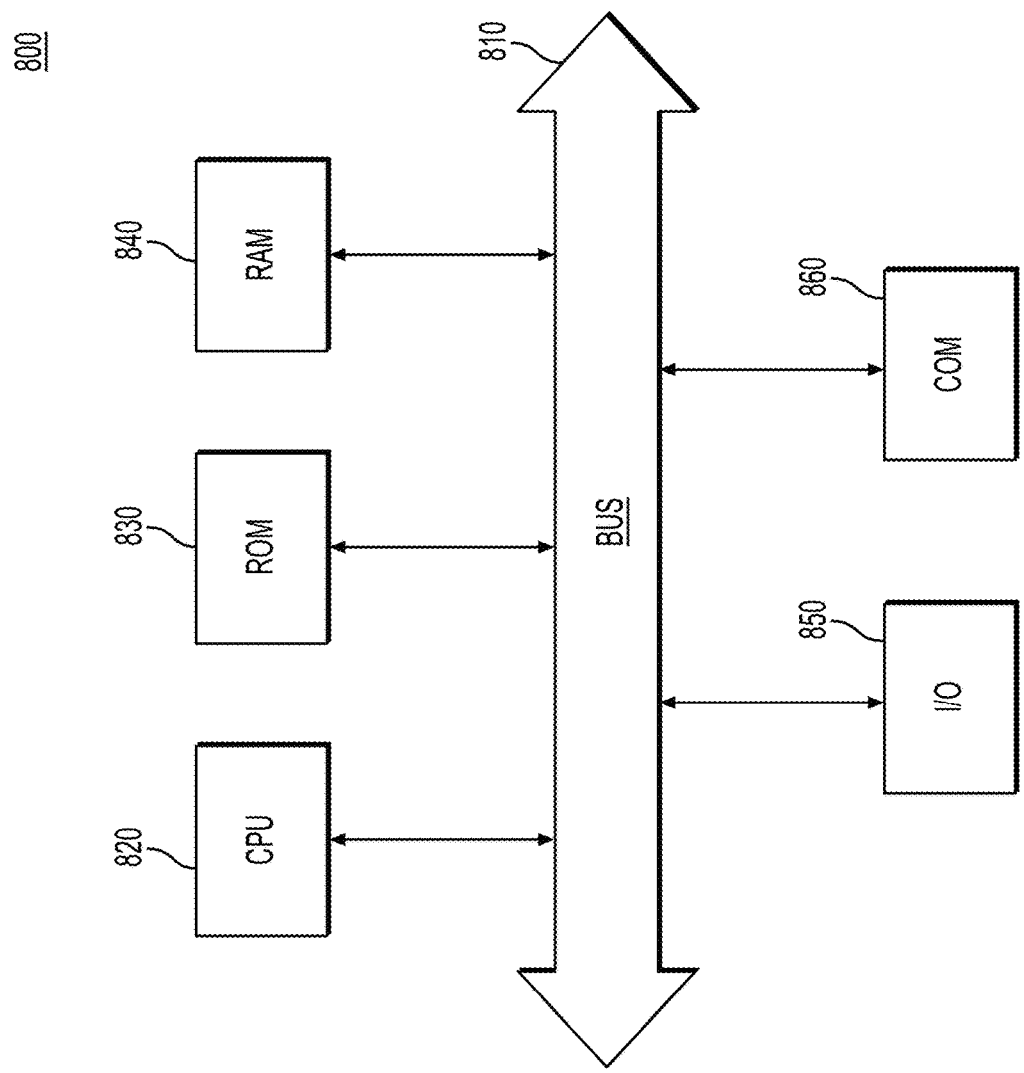

SYSTEMS AND METHODS FOR FORECASTING INBOUND TELECOMMUNICATIONS ASSOCIATED WITH AN ELECTRONIC TRANSACTIONS SUBSCRIPTION PLATFORM

TECHNICAL FIELD

Various embodiments of the present disclosure generally relate to telecommunications forecasting, and more particularly, to analyzing real-time and historical call center data, and applying a forecasting model to said data, in order to predict inbound calls and the human and technological resources that will be necessary to service those calls.

BACKGROUND

Call centers and customer service departments often struggle with the problem of optimal resourcing based on workload demand (customer outreach using via one or more communication channels) while also adhering to service level agreements reached with business partners. As such, call centers and customer service departments require accurate data regarding incoming and outgoing calls, as well as insight into the needs and types of customers that are being communicated with.

Call centers employ various conventional techniques for forecasting inbound and outbound calls. For example, queuing equation-based methods are commonly used in call center management systems, and are by far the most commonly used method for call center forecasting and data analysis. Another commonly used tool, for example, are call center agent management systems, which are primarily employed for short-term personnel scheduling and management. Additionally, call center agent management systems provide tools for forecasting agent workloads as well as automatic and manual methods for assigning agents to work-shifts in order to meet metrics agreed to in service level agreements. In these systems, queuing methods are used to predict the number of agents required to service a given workload, for a specific period of time (e.g. a shift or work day).

However, queuing equation-based methods and call center agent management systems are deficient when used for forecasting purposes for two main reasons. First, queuing equation-based methods require over simplifying agent workflow metrics, which results in inaccurate forecasts for call center needs. Second, call center agent management systems are not designed for forecasting, planning, and analysis, and therefore, relying on said systems for customer call forecasting results in system inefficiencies.

Moreover, existing techniques are unable to account for significant or irregular changes in the amount of business (i.e., number of subscribing customers) being serviced by a given call center. For example, classical approaches such as ARIMA, Exponential smoothing etc., are unable to take into consideration users added through any of the future marketing activities or non-regular activities that a business may use to increase subscribers from day-to-day or month-to-month.

Thus, there is a need for systems and methods that not only take existing users into account but also users to be acquired in future to estimate call volumes. Moreover, there is a need for an approach that utilizes additional metrics and tools to overcome some of the challenges described above.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for telecommunications forecasting to overcome the problems with conventional methods noted above.

In one embodiment, a computer-implemented method for forecasting inbound telecommunications comprising: estimating a number of expected daily retained users within a specific window of time; estimating a number of acquired new users added each day over the upcoming specific window of time via a decay function; calculating an expected daily user count based on the estimated number of expected daily retained users and acquired new users; calculating a total user call rate based on a historic cancellation rate and a historic resolution rate; and calculating a total number of expected calls based on the expected daily user count and total user call rate.

In one embodiment, a system for forecasting inbound telecommunications comprising: a storage device that stores a set of instructions; and at least one processor coupled to the storage device, the set of instructions configuring the at least one processor to: estimating a number of expected daily retained users within a specific window of time; estimating a number of acquired new users added each day over the upcoming specific window of time via a decay function; calculating an expected daily user count based on the estimated number of expected daily retained users and acquired new users; calculating a total user call rate based on a historic cancellation rate and a historic resolution rate; and calculating a total number of expected calls based on the expected daily user count and total user call rate.

In one embodiment, a non-transitory computer-readable medium storing instructions for forecasting inbound telecommunications, the instructions configured to cause at least one processor to perform operations comprising: estimating a number of expected daily retained users within a specific window of time; estimating a number of acquired new users added each day over the upcoming specific window of time via a decay function; calculating an expected daily user count based on the estimated number of expected daily retained users and acquired new users; calculating a total user call rate based on a historic cancellation rate and a historic resolution rate; and calculating a total number of expected calls based on the expected daily user count and total user call rate.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6A depicts an exemplary call center dashboard of a graphical user interface for forecasting expected daily users and forecasting inbound telecommunications associated with the electronic subscriptions platform, according to some embodiments.

FIG. 6B depicts another exemplary call center dashboard of a graphical user interface for forecasting expected daily users and forecasting inbound telecommunications associated with the electronic subscriptions platform, according to some embodiments.

FIG. 8 depicts an exemplary computer device or system, in which embodiments of the present disclosure, or portions thereof, may be implemented.

DETAILED DESCRIPTION OF EMBODIMENTS

Figure 1:
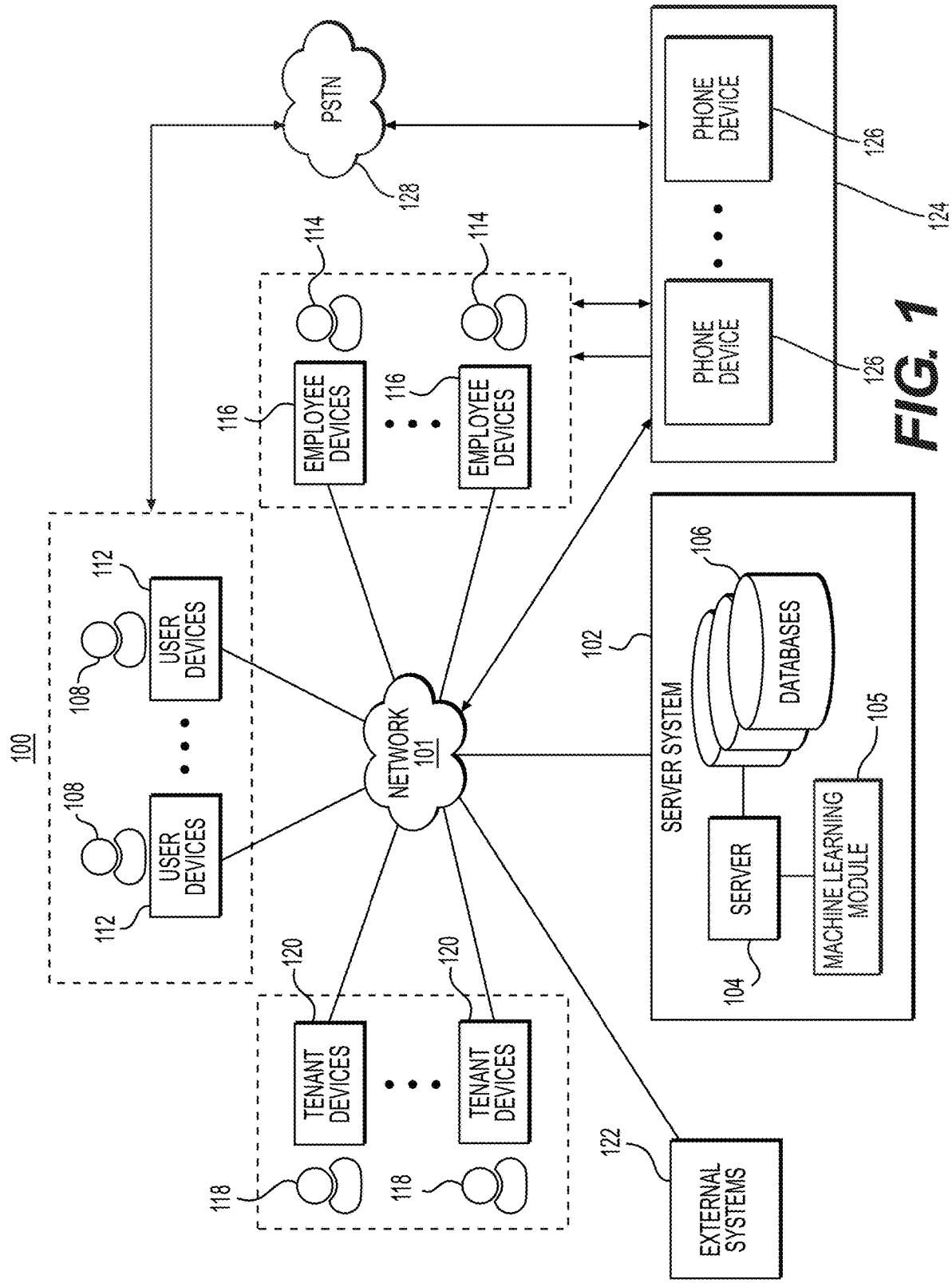
FIG. 1 depicts an example environment in which methods, systems, and other aspects of the present disclosure may be implemented.

As will be described further herein, there is a need for a telecommunications forecasting model that takes into consideration consumers added through various channels (e.g. future consumer acquisition activities or atypical consumer acquisition activities) which typically are not considered in conventional approaches such as ARIMA (i.e., Auto-Regressive Integrated Moving Average), exponential smoothing etc. Therefore, the embodiments disclosed herein provide forecasting models, forecasting tools, and solutions, which can enable call centers to more accurately predict expected inbound telecommunication volumes.

In some embodiments the present disclosure describes an inbound call forecasting method which predicts expected call counts. Call centers often provide telecommunication services for a plurality of business customers/partners, hereinafter referred to in some cases as "tenants." In the embodiment in which a call center is associated with a clothing subscription platform, a "tenant" may be a third-party clothing brand or retailer for which the clothing subscription platform provides the back office services, warehousing, shipping, logistics, web/mobile applications, etc. Providing telecommunication services for such tenants or other business customers often entails responding to communications from consumers that may be subscribers or customers of tenants according to quality and metric guidelines agreed upon in a service level agreement (SLA). However, predicting the requisite call center resources that are necessary for servicing tenant customers presents a challenge in that accurate forecasting models typically need two-to-three years of historical data, which is typically not available for tenants that are new business customers of the subscription platform and/or its associated call center. In addition to the lack of historical tenant customer data, the lack of tenant customer acquisition data and present/future tenant customer acquisition initiative data may also have negative implications on a call center's ability to accurately forecast expected telecommunications volume and call center resource needs.

Accordingly, the embodiments disclosed herein may be applied to technological environments and interactions between a call center system, call center employees, tenant systems, and tenant customer devices. That said, while the exemplary system architecture as described in the present disclosure relates to a call center system and call center dashboard for forecasting tenant customer telecommunication volume, various methods and implementations disclosed herein may effectively serve systems and ancillary methods for managing, subscribing to, purchasing, or renting wearable items (e.g., clothing-as-a-service (CaaS) or Try-Then-Buy (TTB) service), or other online transaction platforms in the context of any other subscription, purchase, rental, or retail services without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, wearable electronics, smart clothing, accessories, or other product which may be worn by a person, an animal, or a thing, or be used as an ornament for a person, an animal, or a thing.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more networks 101 that interconnect a server system 102, user devices 112, employees 114 or employee devices 116, tenant devices 120, external systems 122, call center(s) 124, and Public Switched Telephone Network (PSTN) 128. The one or more networks 101 and/or PSTN 128 may together or separately include, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users (e.g. tenant customers) 108, employee devices 116 may be accessed by authorized employees (e.g. call center employees) 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof.

Users 108 may access the server system 102 through the one or more networks 101 using user devices 112. Each device among the user devices 112 may be any type of computing device (e.g., personal computing device, mobile computing devices, etc.) which allows users 108 to display a web browser or an application for accessing the server system 102 through the network 101. The user devices 112 may, for example, be configured to display a web browser, a web based application, or any other user interface (e.g., one or more mobile applications) for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription based distribution via electronic transactions and physical shipment. Additionally, or alternatively, users 108 may use user devices 112 to communicate with phone devices 126 of call center 124 to manage one or more user accounts, cancel a subscription, create a new account, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features, such as a closet assistant, size advisor, perform personalized discovery, and/or make recommendations. It should be appreciated that users 108 may alternatively or additionally perform any of these tasks by accessing server system 102, whether via network 101 or PSTN 128 with their user devices 112.

Employee devices 116 may be configured to be accessed by one or more employees 114, including, for example, customer service employees, call center managers, call center employees, marketer employees, warehouse employees, analytics employees, or any other employees who are authorized and/or authenticated to perform tasks, operations, and/or transactions associated with the server system 102, external systems 122, and/or the call center 124. Employee devices 116 may be the same as or different from phone devices 126 of call center 124. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to view a web browser or an application for accessing the server system 102 and/or the external systems 122, through the one or more networks 101. For example, a device among the one or more of the employee devices 116 may load an application with graphical user interface (GUI) (e.g. a call center dashboard), and the application may display on the GUI one or more call center operations associated with providing CaaS to users 108. In some implementations, the employee devices 116 may communicate directly with the server system 102 and call center 124 via a communications link bypassing public networks 101. Additionally, or alternatively, the employee devices 116 may communicate with the server system 102 via network 101 (e.g., access by web browsers or applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandiser, or a brand owner entity that supplies one or more collections of wearable items to the CaaS inventory managed and/or accessed by the server system 102. Tenants 118 may use one or more electronic tenant interfaces (e.g., a customer management system associated with each tenant) to provide the server system 102 or call center 124 with tenant customer data (e.g., number of subscribers, subscriber call data, subscriber account information) that may transmitted to and/or stored on server system 102. For example, tenant data for each of the one or more tenants 118 may be generated and/or updated at the server system 102 or call center 124 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a dashboard, a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

Call center 124 may be one or more physical buildings or virtual (remote) networks of telephony systems including, for example, one or more servers, routers, switches, telephony components, phone devices 126 (which may comprise of various call center technology, such as: predictive dialer, a VOIP system, a data handler, etc.), and/or dashboards, that integrate with or provide functionality and telephony services to the employee devices 116. Call center 124 may be in communication with other device(s) or system(s) in the environment 100 over the one or more networks 101. For example, call center 124 may communicate with the server system 102 via API (application programming interface) access and/or one or more internet protocols, over the one or more networks 101, and also communicate with the employee devices 116 via a dashboard, and/or internet protocols, over the one or more networks 101.

Public Switched Telephone Network (PSTN) 128 may be, for example, one or more servers, routers, switches, telephony components, customer premises equipment (CPE) (e.g., routers, switches, real property gateways, set-top boxes, fixed mobile convergence products, networking adapters and Internet access gateways), switching equipment (e.g. authentication nodes, call control/switching nodes, charging nodes), and call switching components. PSTN 128 may be in communication with other device(s) or system(s) in the environment 100 over the one or more networks 101. For example, PSTN 128 may communicate with call center 124 via one or more telephony protocols. PSTN 128 may communicate with server system 102 via API (application programming interface) access and/or one or more telephony or internet protocols, over the one or more networks 101, and also communicate with the employee devices 116 and tenant devices 120 via a dashboard, and/or internet protocols, over the one or more networks 101. As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

Figure 2:
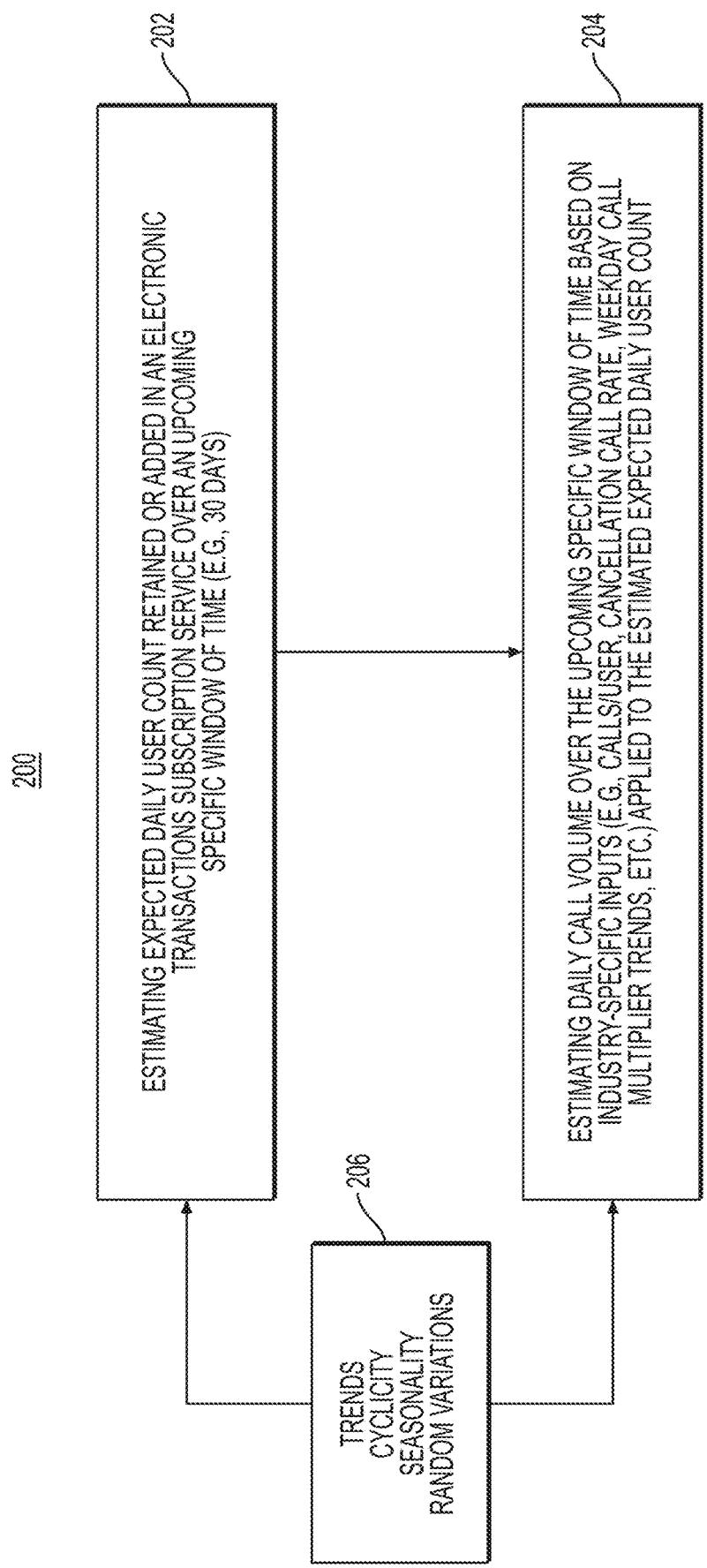
FIG. 2 depicts an exemplary high-level process for forecasting inbound telecommunications, according to some embodiments.

FIG. 2 depicts an exemplary high-level process for forecasting inbound telecommunications, according to some embodiments. As shown in FIG. 2, steps for forecasting inbound telecommunications may include estimating expected daily user count retained or added in an electronic transactions subscription service over an upcoming specific window of time (Step 202) and estimating daily call volume over the upcoming specific window of time based on industry-specific inputs (e.g., calls/user, cancellation call rate, weekday call multiplier trends, cyclicity, seasonality, and random variations, etc.) (from Step 206) applied to the estimated expected daily user count (Step 204).

A trend relevant to calculating expected daily user count and/or daily call volume may be derived from historic data known about a user and future projections based on recently acquired users. Cyclicity and seasonality may be derived from aggregating data over long periods of time (e.g. 5-20 years). Specifically, cyclicity and seasonality trends may provide data for specific time periods within a year regarding user peak or non-peak demand levels. In instances where new tenants (e.g., clothiers/business partners) are established, there may otherwise be very little historical data regarding the tenant's users (i.e., customers/subscribers). Therefore current call volumes for current users over a recent period of time (e.g., the trailing three months or four weeks), may be utilized to forecast expected daily user count. Regarding random variations, classical forecasting techniques might traditionally be insufficient to account for random or abrupt variations in input data (e.g., user trends and/or call volume data, user retention rate, etc.). By contrast, the use of inputs (Step 206) into the instant forecasting model allows for flexible data inputs, such as call rate, decay multiplier, weekday multiplier etc., which can be factored into the forecasting model in real-time to reflect changing business parameters without re-running the model as would be the case with classical approaches. Hence, the disclosed model provides much more flexibility to adjust to the current business scenarios. Expected daily user count can also used to identify a number of users that are expected to lost during specific period of time (e.g., a month) and the expected daily user count can be linearly decayed to account for different users (e.g., customers/subscribers) having different renewal billing dates every month. Both steps 202 and 204 further comprise sub-steps, that will be described in FIG. 3 and FIG. 4 respectively. The decay function may be comprised of one or more sub-functions for factoring in a user call-in type (e.g. cancellations) over specific periods of time (e.g. cancellations within the last 24 hours, 2-7 days cancellations, and 8-30 days cancellations).

Figure 3:
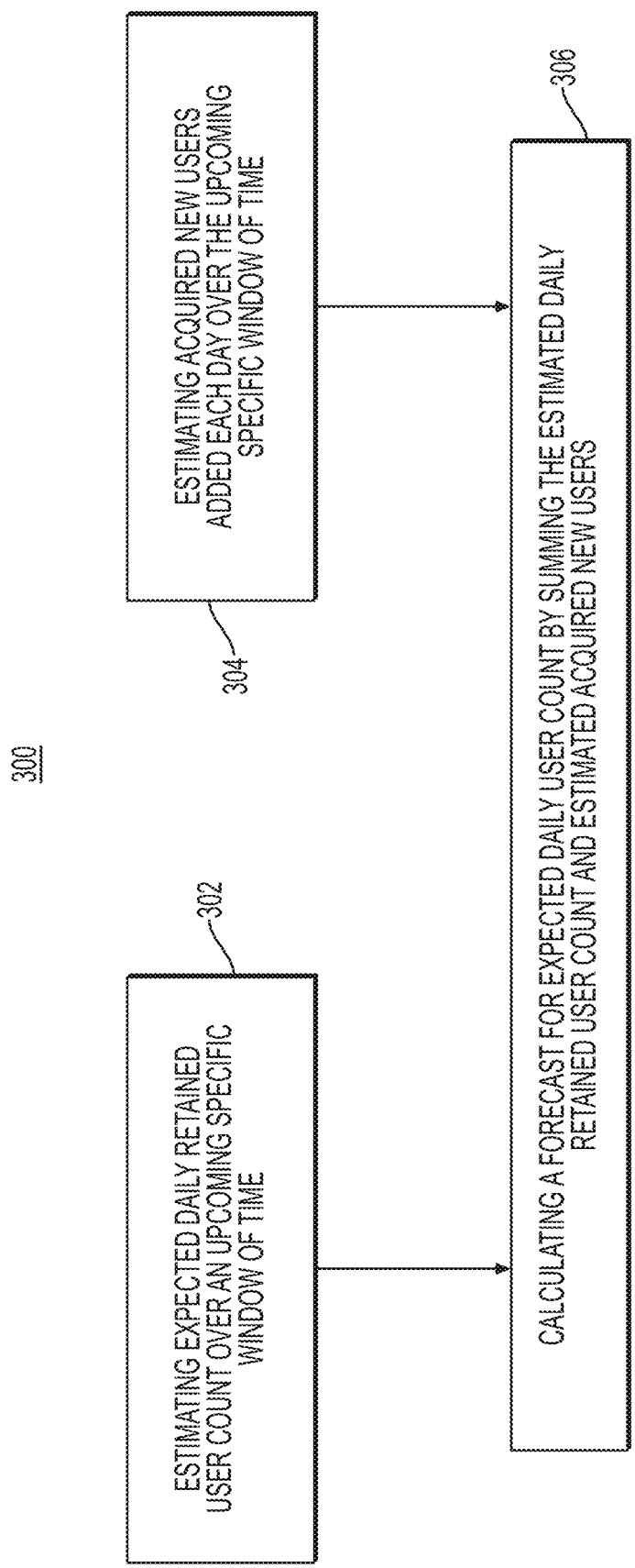
FIG. 3 depicts an exemplary sub-process for forecasting expected daily users of an electronic subscriptions platform, according to some embodiments.

FIG. 3 depicts an exemplary sub-process for forecasting expected daily users of an electronic subscriptions platform, according to some embodiments. In an exemplary embodiment, FIG. 3 depicts exemplary sub-steps of Step 202 from FIG. 2. For example, estimating expected daily user count over an upcoming specific window of time may comprise both (i) estimating expected daily retained user count over an upcoming specific window of time (Step 302) as well as (ii) estimating acquired new users added each day over the upcoming specific window of time (Step 304). Here, in addition to estimating the daily expected user count, server system 102 (or the server system 102 in conjunction with other systems, for example the call center 124 on the network 101) may estimate the number of new users expected to be acquired over an upcoming period of time (e.g. 30 days, one month, etc.). Users may be acquired both organically and through marketing initiatives.

Regarding users added through marketing initiatives, server system 102 (or the server system 102 in conjunction with other systems, for example the call center 124 on the network 101) may calculate a number of users acquired via marketing initiatives by receiving input from a look-up table or employees 114, or predicting a number of acquired users via a machine learning trained on a number of new users expected to be added via marketing initiatives. Once the number of new users expected to be added via marketing initiatives is predicted, an algorithm implemented by the server system 120 or call center 124 may decay this number to calculate the expected a number of users expected to remain customers at the end of a specific period of time (e.g., a month, a quarter, a year, etc.). The algorithm decay function may linearly distribute cancelled users and remaining users (i.e., customers) in order to account for exponential cancels and retained users.

Regarding organically acquired users (i.e., users that are customers of tenants), server system 102 (or the server system 102 in conjunction with other systems, for example the call center 124 on the network 101) may calculate a number of organically acquired users by receiving an average number of daily acquired users as inputs from employees 114 or accessing a storage device (e.g., self-referential database) to retrieve data representative of the actual number of new users that have been added organically. Once the average number of new users that have been added organically is identified, an algorithm implemented by the server system 120 or call center 124 may similarly decay this number to calculate the expected a number of users expected to cancel and/or to remain customers at the end of a specific period of time (e.g., a month, a quarter, a year, etc.). The algorithm decay function may linearly distribute cancelled users and remaining users (i.e. customers) in order to account for exponential cancels and retained users. The estimated outcomes of steps 302 and 304 are then summed in implementing step 306. Specifically, method 300 may then comprise calculating a forecast for expected daily user count by summing the estimated daily user count and estimated acquired new users over the upcoming specific window of time (Step 306), on a day-by-day basis. For example, an algorithm may be applied to the estimated expected daily user count and the estimated number of newly acquired users, wherein the algorithm at least sums the estimated expected daily user count and the estimated number of newly acquired users in order to forecast an expected user count. It should be appreciated that user count may be calculated on any other desired interval, such as minute-by-minute, hour-by-hour, or week-by-week.

Figure 4:
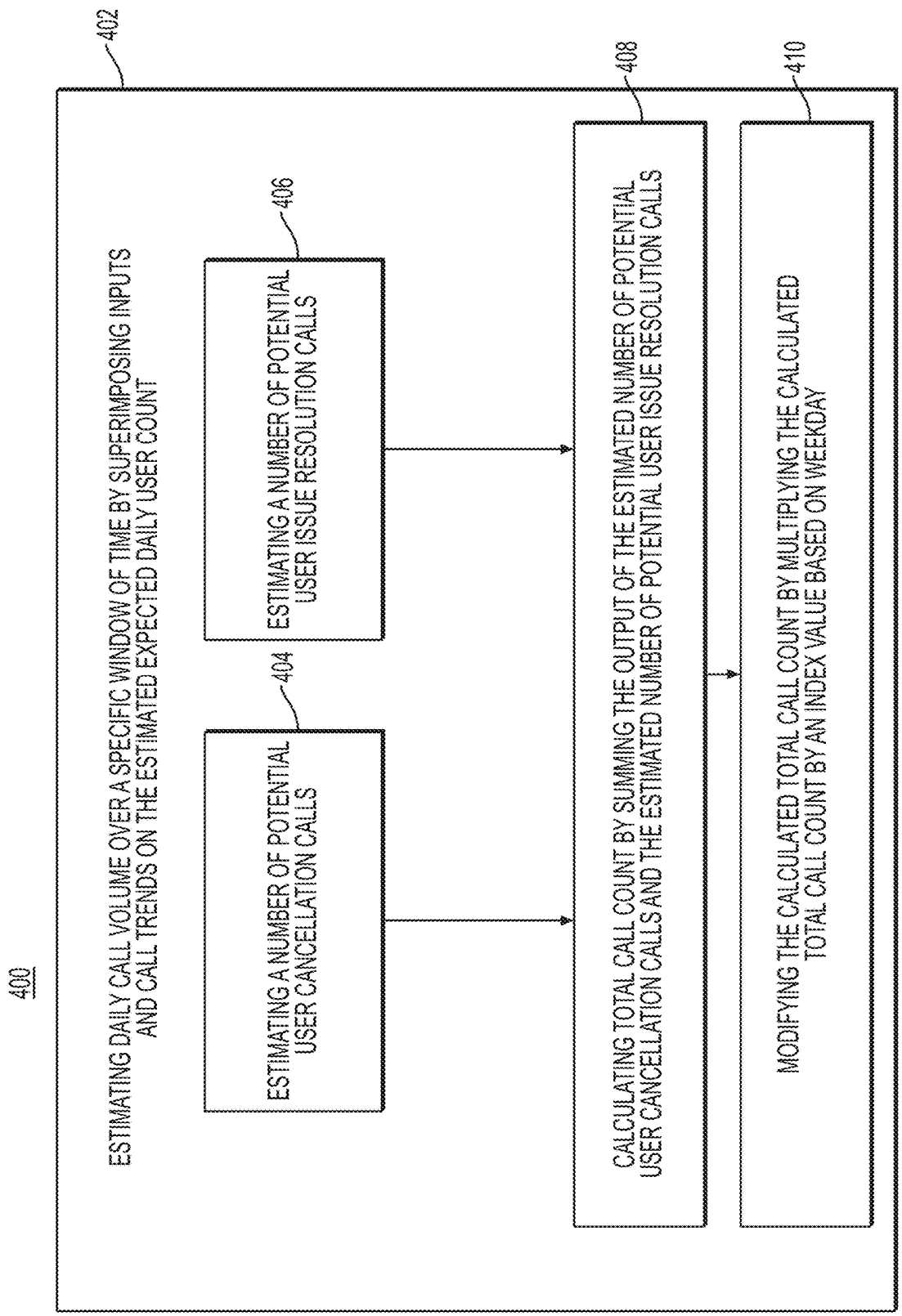
FIG. 4 depicts an exemplary sub-process for forecasting inbound telecommunications associated with the electronic subscriptions platform given a calculated expected daily user count, according to some embodiments.

FIG. 4 depicts an exemplary sub-process for forecasting inbound telecommunications associated with the electronic subscriptions platform given a calculated expected daily user count, according to some embodiments. In one embodiment, FIG. 4 depicts the sub-steps of Step 204 from FIG. 2. For example, estimating daily call volume over a specific window of time by superimposing inputs and call trends on the estimated expected daily user (Step 204) may include several sub-steps of method 400 of FIG. 4, that is, steps 404-410. Although the following steps may be performed in a different order, in an exemplary embodiment, estimating daily call volume over a specific window of time by superimposing inputs and call trends on the estimated expected daily user (Step 402) may comprise (i) estimating a number of potential user cancellation calls (Step 404), and then (ii) estimating a number of potential user issue resolution calls (Step 406). For example, one or more systems (e.g. server system 102 and/or call center 124) in environment 100 may estimate a number of users that may be expected to cancel their subscription over a specific period of time. Superimposed inputs may be received via employee devices 116, predicted via machine learning techniques, and/or generated automatically by server system 120 and/or call center 124. Next, one or more systems in environment 100 may perform a step for estimating a number of potential user issue resolution calls (Step 406). For example, the server system 102 or call center 124, independently or in conjunction, may estimate the number of potential calls wherein users need an issue resolved in a specific time period (e.g. one month, or three months, one year, etc.). In one embodiment, the estimated number of cancellation calls and/or issue resolution calls may be estimated based on a number of factors as described in more detail below, including number of subscribers/users, trends, seasonality, cyclicity, etc.

The estimated values of steps 404-406 may then be used in an algorithm for calculating total call count, for example, in one embodiment by summing the output of the estimated number of potential user cancellation calls and the estimated number of potential user issue resolution calls (Step 408). For example, an algorithm may at the very least, sum the estimated number of potential user cancellation calls and the estimated number of potential user issue resolution calls, in order to calculate an expected total call count. The one or more systems in environment 100 may then implement a process for modifying the calculated total call count by multiplying the calculated total call count by an index value based on weekday (Step 410). For example, the server system 102 and/or the call center 124 may then modify the calculated total call count by multiplying the calculated total call count by an index value (i.e., a load factor, which is a value that represents in user call volume, for a given category. For example, if calls increase by 10%, the load factor will be 1.1.).

Figure 5:
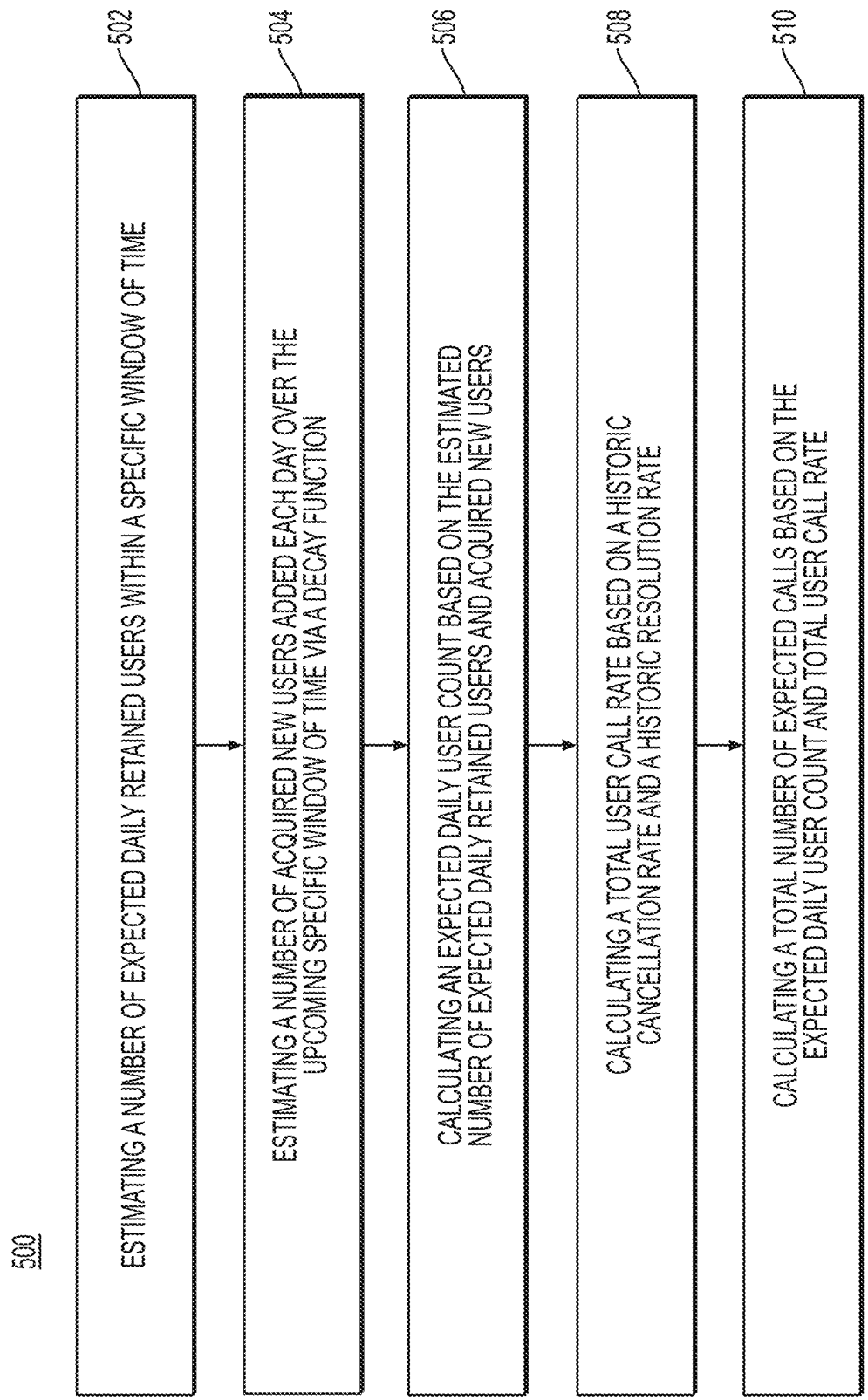
FIG. 5 depicts an exemplary process for telecommunications forecasting, according to some embodiments.

FIG. 5 depicts an exemplary process for telecommunications forecasting, according to some embodiments. Although the following steps may be performed in a different order, in an exemplary embodiment, one or more systems in environment 100 may initiate the process for forecasting telecommunications by estimating a number of expected daily retained users within a specific window of time (Step 502). For example, server system 102 and/or call center 124 may estimate a number of retained subscribers (i.e., the number of subscribers that maintain their subscription) for a specific window of time (e.g., thirty days, one month, one year, etc.). One or more systems (e.g. server system 102 and/or call center 124) in environment 100 may then implement a step for estimating a number of acquired new users added each day over the upcoming specific window of time via a decay function (Step 504). For example, an algorithm implemented by the server system 102 may estimate an expected number of new users for specific window of time (e.g., thirty days, one month, one year, etc.). The one or more systems may then implement a step for calculating an expected daily user count based on the estimated number of expected daily retained users and acquired new users (Step 506). For example, an algorithm may be applied to the estimated expected daily user count and the estimated number of newly acquired users, wherein the algorithm at least sums the estimated expected daily user count and the estimated number of newly acquired users in order to forecast an expected user count.

The one or more systems may then implement a step for calculating a total user call rate based on a historic cancellation rate and a historic resolution rate (Step 508). Here, for example, an algorithm may retrieve data pertaining to historic cancellation rate and historic resolution rate, and some instances sum these retrieved figures in order to calculate a total user call rate. Calculating a total number of expected calls based on the expected daily user count and total user call rate (Step 510). For example, the one or more systems (e.g. server system 102 and/or call center 124) may calculate the total number of expected calls, in one instance, by multiplying the expected daily user count by the total user call rate. Alternatively, the expected daily user count and total user call rate may just be one of several variables in an algorithm that calculates the total number of expected calls.

FIG. 6A depicts an exemplary call center dashboard 602 of a graphical user interface for forecasting expected daily users and forecasting inbound telecommunications associated with the electronic subscriptions platform, according to some embodiments. According, to one embodiment, a call center dashboard may include an interface for establishing parameters and inputs in order to forecast inbound communications. Dashboard 602 may be made available to employees 116 in order the employees 116 to forecast inbound communications by allowing the employees 116 to define which parameters and inputs should be utilized in forecasting said inbound communications. Specially, FIG. 6A depicts a dashboard for employees 116 to manipulate parameters and inputs for brands owned by an entity which also owns or operates call center 124. As depicted in regions 604, 606, and 608, once parameters (e.g., customer conversion/retention rate, time, customer cancellations, acquired new users, load factor, etc.) and each parameters associated inputs are factored in, a forecast for inbound telecommunications can be generated. Specifically, region 604 is at least comprised of fields, widgets, menus, and data, that can be manipulated in order to generate parameters associated with user (i.e., customer/subscriber) conversion/retention rate. Region 606 is at least comprised of fields, widgets, menus, and data, that can be manipulated in order to generate parameters associated with user (i.e., customer/subscriber) cancellation/postponement rate, contract rate, marketing conversion rate, and load factor. Region 608 is at least comprised of fields, widgets, menus, and data, that can be manipulated in order to generate parameters associated with user (i.e., customer/subscriber) acquired users and change in the number of users due to marketing campaigns, as a function of time (e.g., a week, month, year, etc.).

FIG. 6B depicts another exemplary call center dashboard 602 of a graphical user interface for forecasting expected daily users and forecasting inbound telecommunications associated with the electronic subscriptions platform, according to some embodiments. According, to one embodiment, a call center dashboard may include an interface for establishing parameters and inputs in order to forecast inbound communications. Dashboard 602 may be made available to employees 116 in order the employees 116 to forecast inbound communications by allowing the employees 116 to define which parameters and inputs should be utilized in forecasting said inbound communications. Specially, FIG. 6B depicts a dashboard for employees 116 to manipulate parameters and inputs for clothiers owned by one or more tenants 118. As depicted in regions 610, 612, and 614, once parameters (e.g., customer conversion/retention rate, time, customer cancellations, acquired new users, load factor, etc.) and each parameters associated inputs are factored in, a forecast for inbound telecommunications can be generated. Specifically, region 604 is at least comprised of fields, widgets, menus, and data, that can be manipulated in order to generate parameters associated with user (i.e., customer/subscriber) conversion/retention rate. Region 606 is at least comprised of fields, widgets, menus, and data, that can be manipulated in order to generate parameters associated with user (i.e., customer/subscriber) cancellation/postponement rate, contract rate, marketing conversion rate, and load factor. Region 608 is at least comprised of fields, widgets, menus, and data, that can be manipulated in order to generate parameters associated with user (i.e. customer/subscriber) acquired users and change in the number of users due to marketing campaigns, as a function of time (e.g., a week, month, year, etc.).

Figure 7A:
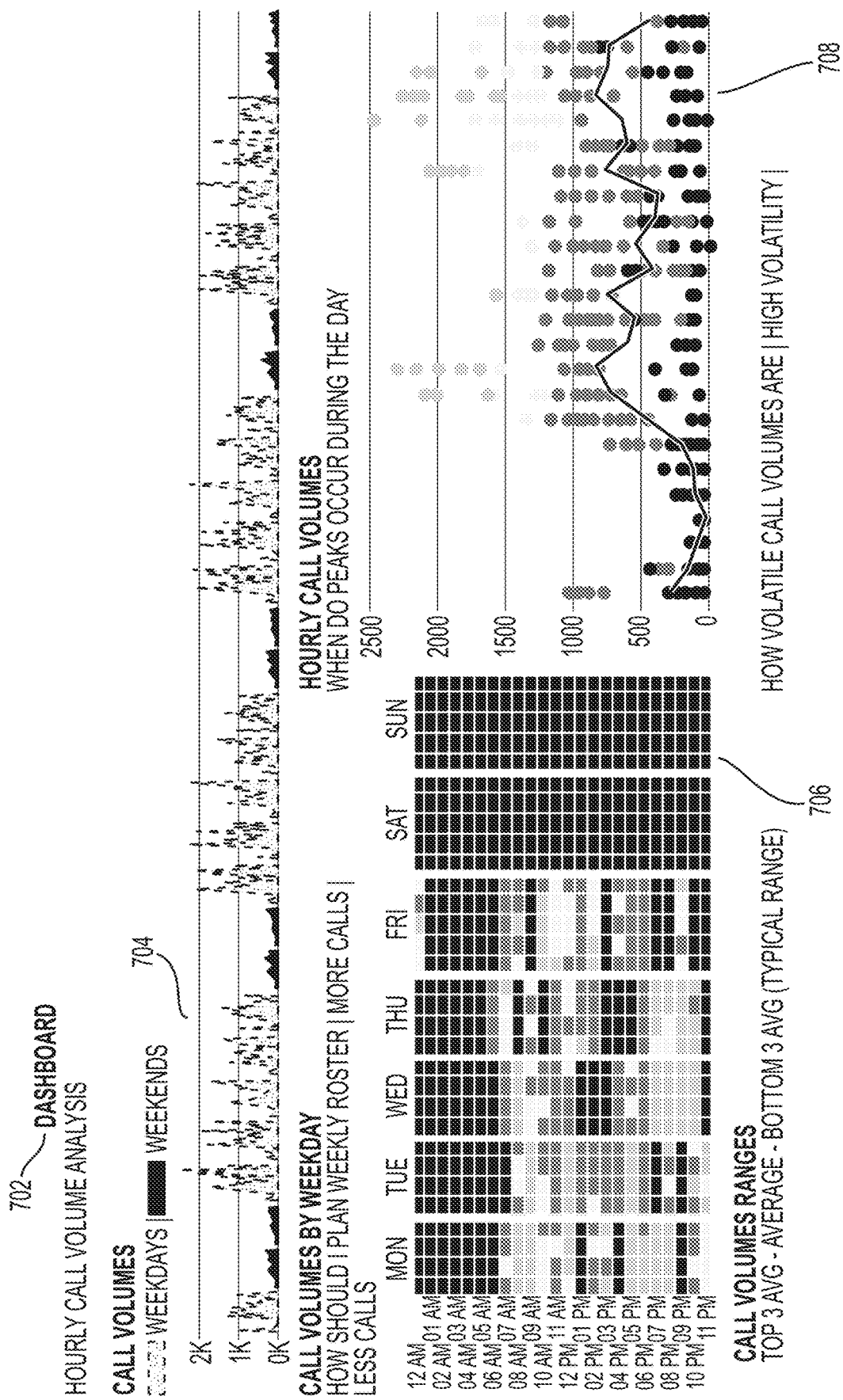
FIG. 7A depicts an exemplary call center dashboard comprising a graphical user interface, according to some embodiments.

FIG. 7A depicts an exemplary call center dashboard 702 comprising a graphical user interface, according to some embodiments. According to one embodiment, a call center dashboard may include: a home dashboard user interface, a communication routing interface, a simulation interface, an employee user interface, and/or a tenant user interface hosted by call center 124 and/or server system 102. The employee user interface may include, but is not limited to, an employee team interface and widget, and an employee profile interface. A simulation interface may include, but is not limited to, an interface for entering multiple variables and running simulations capable of projecting forecasted outcomes. The routing dashboard user interface may include, but is not limited to, a call routing selection interface. The reporting user interface may include, but is not limited to, a main reporting dashboard, a report details dashboard, and one or more menu options/widgets for generating custom reports. The reporting user interface may be used, for example, by an employee or manager managing the employees for a call center. According to this embodiment, various performance visualization tools can be generated. For example, employees 114 may be able to generate a call volume tool 604 capable of depicting the number of calls received, number of calls placed, and/or the type of call for one or more employees. Employees 114 performance may be depicted in different formats. For example, an employees 114 performance may be depicted as a function of time call volume range tool 706. The call volume range tool may further comprise heat map features capable of emphasizing and distinguishing between data points. Dashboard 702 may additionally include a subscriber tool 708, capable of visualizing metrics data corresponding to subscribers. For example, subscriber tool 608 may be manipulated by employees 114 to convey metrics pertaining to subscriber conversion rates, subscriber retention rates, subscriber tenure information, subscriber cancellations, and subscriber information on a per tenant basis. According to one embodiment, security code and protocols running on the server system 102, employee devices 116, tenant devices 120, external systems 122, and/or call center 124, implement one or more APIs to manage to access to the dashboard. For example, employee device 114 and/or tenant device 120 may perform a handshake with server system 102 and/or call center 124 in order to access call data and/or subscriber data.

Figure 7B:
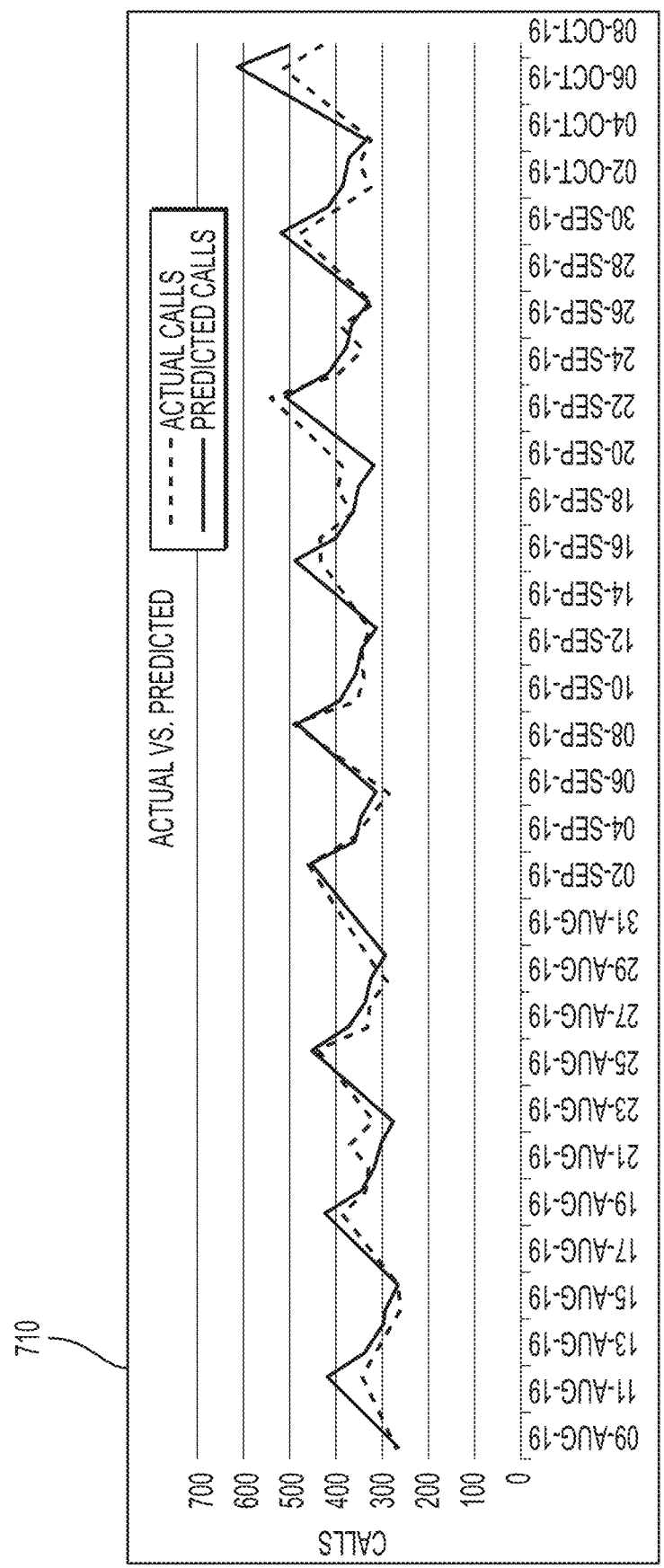
FIG. 7B depicts an exemplary call center dashboard report displayed via a graphical user interface, according to some embodiments.

FIG. 7B depicts an exemplary call center dashboard report 710 displayed via a graphical user interface, according to some embodiments. As disclosed in relation to FIG. 7A, call center dashboard 702 may further include an interface configured to generate reports (e.g. graphs, meat maps, histograms, and icons) to visual depict collected and forecasted data regarding call data and user data. Specifically, call center dashboard report 710 is graph representing actual inbound calls and predicted inbound calls. Such reports are beneficial in that they visually represent the output accuracy of forecasting models implemented by employees 114 and other entities with access to call center dashboard 702.

FIG. 8 depicts an exemplary computer device or system, in which embodiments of the present disclosure, or portions thereof, may be implemented. As shown in FIG. 8, a device 800 used for performing the various embodiments of the present disclosure (e.g., the server system 102, the user devices 112, the employee devices 116, the tenant devices 120, and/or any other computer system or user terminal for performing the various embodiments of the present disclosure) may include a central processing unit (CPU) 820. CPU 820 may be any type of processor device including, for example, any type of special purpose or a general-purpose microprocessor device. As will be appreciated by persons skilled in the relevant art, CPU 820 also may be a single processor in a multi-core/multiprocessor system, such system operating alone, or in a cluster of computing devices operating in a cluster or server farm. CPU 820 may be connected to a data communication infrastructure 810, for example, a bus, message queue, network, or multi-core message-passing scheme.

A device 800 (e.g., the server system 102, the user devices 112, the employee devices 116, the tenant devices 120, and/or any other computer system or user terminal for performing the various embodiments of the present disclosure) may also include a main memory 840, for example, random access memory (RAM), and may also include a secondary memory 830. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 830 may include other similar means for allowing computer programs or other instructions to be loaded into device 800. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 800.

A device 800 may also include a communications interface ("COM") 760. Communications interface 860 allows software and data to be transferred between device 700 and external devices. Communications interface 860 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 860. These signals may be provided to communications interface 860 via a communications path of device 800, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. A device 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software"

is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for forecasting inbound telecommunications comprising:
   estimating a number of expected daily retained users within a specific window of time;
   estimating a number of acquired new users added each day over the specific window of time via a decay function;
   calculating an expected daily user count based on the estimated number of expected daily retained users and acquired new users;
   calculating a total user call rate based on a historic cancellation rate and a historic resolution rate; and
   calculating a total number of expected calls based on the expected daily user count and total user call rate.

2. The computer-implemented method of claim 1, wherein forecasting inbound telecommunications further comprises implementing machine learning techniques in or to generate an expected daily acquired user count.

3. The computer-implemented method of claim 1, wherein forecasting inbound telecommunications further comprises receiving inbound communications at a call center from a public switched telephone network and routing inbound communications to an employee associated with the call center.

4. The computer-implemented method of claim 1, wherein forecasting inbound telecommunications further comprises: predicting expected user count and current communication trends for an upcoming 30 day window.

5. The computer-implemented method of claim 1, wherein forecasting inbound telecommunications further comprises: calculating an average error associated with the actual and predicted expected total call count.

6. The computer-implemented method of claim 1, wherein forecasting inbound telecommunications further comprises: generating a forecasting report via a graphical user interface; and
   wherein the forecasting report depicts predicted call ranges as a function of volume over time via a heat map.

7. The computer-implemented method of claim 1, wherein calculating expected user count further comprises: receiving input data for one or more of: historic actual user call rate, average call rate, and user cancellations.

8. A system for forecasting inbound telecommunications comprising:
   a storage device that stores instructions; and
   at least one processor that executes the instructions in order for:
   estimating a number of expected daily retained users within a specific window of time;
   estimating a number of acquired new users added each day over the specific window of time via a decay function;
   calculating an expected daily user count based on the estimated number of expected daily retained users and acquired new users;
   calculating a total user call rate based on a historic cancellation rate and a historic resolution rate; and
   calculating a total number of expected calls based on the expected daily user count and total user call rate.

9. The system of claim 8, wherein forecasting inbound telecommunications further comprises implementing machine learning techniques in or to generate an expected daily acquired user count.

10. The system of claim 8, wherein forecasting inbound telecommunications further comprises receiving inbound communications at a call center from a public switched telephone network and routing inbound communications to an employee associated with the call center.

11. The system of claim 8, wherein forecasting inbound telecommunications further comprises: predicting expected user count and current communication trends for an upcoming 30 day window.

12. The system of claim 8, wherein forecasting inbound telecommunications further comprises: calculating an average error associated with the actual and predicted expected total call count.

13. The system of claim 8, wherein forecasting inbound telecommunications further comprises: generating a forecasting report via a graphical user interface; and
   wherein the forecasting report depicts predicted call ranges as a function of volume over time via a heat map.

14. The system of claim 8, wherein calculating expected user count further comprises: receiving input data for one or more of: historic actual user call rate, average call rate, and user cancellations.

15. A non-transitory computer-readable medium storing instructions for forecasting inbound telecommunications, the instructions configured to cause at least one processor to perform operations comprising:
   estimating a number of expected daily retained users within a specific window of time;
   estimating a number of acquired new users added each day over the specific window of time via a decay function;
   calculating an expected daily user count based on the estimated number of expected daily retained users and acquired new users;
   calculating a total user call rate based on a historic cancellation rate and a historic resolution rate; and
   calculating a total number of expected calls based on the expected daily user count and total user call rate.

16. The non-transitory computer-readable medium of claim 15, wherein forecasting inbound telecommunications further comprises implementing machine learning techniques in or to generate an expected daily acquired user count.

17. The non-transitory computer-readable medium of claim 15, wherein forecasting inbound telecommunications further comprises receiving inbound communications at a call center from a public switched telephone network and routing inbound communications to an employee associated with the call center.

18. The non-transitory computer-readable medium of claim 15, wherein forecasting inbound telecommunications further comprises: predicting expected user count and current communication trends for an upcoming 30 day window.

19. The non-transitory computer-readable medium of claim 15, wherein forecasting inbound telecommunications further comprises: calculating an average error associated with the actual and predicted expected total call count.

20. The non-transitory computer-readable medium of claim 15, wherein forecasting inbound telecommunications further comprises: generating a forecasting report via a graphical user interface; and wherein the forecasting report depicts predicted call ranges as a function of volume over time via a heat map.

\* \* \* \* \*